United States Patent
Kawaguchi

(10) Patent No.: US 10,605,203 B2
(45) Date of Patent: Mar. 31, 2020

(54) DEVICE, SYSTEM, AND METHOD FOR PRESSURIZING AND SUPPLYING FLUID

(71) Applicant: Patched Conics, LLC., Yamanashi (JP)

(72) Inventor: Junichiro Kawaguchi, Uenohara (JP)

(73) Assignee: PATCHED CONICS, LLC., Yamanashi (JP)

( * ) Notice: Subject to any disclaimer, the term of this patent is extended or adjusted under 35 U.S.C. 154(b) by 464 days.

(21) Appl. No.: 15/322,294

(22) PCT Filed: Sep. 25, 2014

(86) PCT No.: PCT/JP2014/075333
§ 371 (c)(1),
(2) Date: Dec. 27, 2016

(87) PCT Pub. No.: WO2016/046924
PCT Pub. Date: Mar. 31, 2016

(65) Prior Publication Data
US 2017/0167442 A1     Jun. 15, 2017

(51) Int. Cl.
*F02K 9/46* (2006.01)
*F02K 9/50* (2006.01)
(Continued)

(52) U.S. Cl.
CPC ............ *F02K 9/46* (2013.01); *B64G 1/26* (2013.01); *B64G 1/402* (2013.01); *F02K 9/50* (2013.01);
(Continued)

(58) Field of Classification Search
CPC .... F02K 9/46; F02K 9/50; B64G 1/26; B64G 1/402; F04B 27/00; F04B 39/0005;
(Continued)

(56) References Cited

U.S. PATENT DOCUMENTS 4,583,362 A    4/1986    Wagner
5,219,270 A    6/1993    Titmas
(Continued)

FOREIGN PATENT DOCUMENTS

CN    101243285 A    8/2008
GB    2401592 A    11/2004
(Continued)

OTHER PUBLICATIONS

International Search Report; PCT/JP2014/075333 dated Dec. 16, 2014.
(Continued)

*Primary Examiner* — Justin M Benedik
(74) *Attorney, Agent, or Firm* — Studebaker & Brackett PC

(57) ABSTRACT

A heat exchanger generally employs a method for supplying liquid having critical pressure or higher or high pressure in order to suppress boiling. However, gas obtained by a evaporator behind the heat exchanger has relatively low pressure, and therefore supplying the liquid to the heat exchanger requires a system for converting an energy form of the obtained gas into kinetic energy or electrical energy, and increasing the pressure by a mechanical pump. Thus, the complicated system involving an efficiency loss is only solution, and it is difficult to achieve simplification of a system or reduction in the weight of a propellant supply device in a moving body, specifically, a flying object.

12 Claims, 10 Drawing Sheets

(51) Int. Cl.
*F04F 13/00* (2009.01)
*B64G 1/26* (2006.01)
*B64G 1/40* (2006.01)
*F04B 27/00* (2006.01)
*F04B 39/00* (2006.01)
*F04B 39/06* (2006.01)
*F17C 7/04* (2006.01)

(52) U.S. Cl.
CPC .......... *F04B 27/00* (2013.01); *F04B 39/0005* (2013.01); *F04B 39/0027* (2013.01); *F04B 39/06* (2013.01); *F04F 13/00* (2013.01); *F17C 7/04* (2013.01); *F05D 2220/80* (2013.01); *F17C 2201/018* (2013.01); *F17C 2201/054* (2013.01); *F17C 2221/011* (2013.01); *F17C 2221/012* (2013.01); *F17C 2221/013* (2013.01); *F17C 2221/014* (2013.01); *F17C 2221/033* (2013.01); *F17C 2221/035* (2013.01); *F17C 2221/08* (2013.01); *F17C 2223/013* (2013.01); *F17C 2223/0153* (2013.01); *F17C 2223/0161* (2013.01); *F17C 2223/035* (2013.01); *F17C 2225/0123* (2013.01); *F17C 2227/0142* (2013.01); *F17C 2227/0302* (2013.01); *F17C 2227/0309* (2013.01); *F17C 2227/0376* (2013.01); *F17C 2260/02* (2013.01); *F17C 2270/0197* (2013.01)

(58) Field of Classification Search
CPC ....... F04B 39/0027; F04B 39/06; F04F 13/00; F17C 7/04
See application file for complete search history.

(56) References Cited

U.S. PATENT DOCUMENTS

| | | |
|---|---|---|
| 5,222,873 A | 6/1993 | Whitehead et al. |
| 5,644,920 A * | 7/1997 | Lak ............... B64G 1/402 62/47.1 |
| 5,802,842 A | 9/1998 | Hook et al. |
| 6,293,002 B1 | 9/2001 | Oh et al. |
| 6,332,266 B1 | 12/2001 | Park et al. |
| 6,457,306 B1 | 10/2002 | Abel et al. |
| 6,467,253 B1 | 10/2002 | Haggander |
| 6,658,863 B2 | 12/2003 | Beck et al. |
| 6,751,945 B1 | 6/2004 | Knight |
| 6,834,493 B2 | 12/2004 | Hashimoto et al. |
| 7,082,750 B2 | 8/2006 | Knight |
| 7,194,853 B1 | 3/2007 | Knight |
| 7,257,940 B1 | 8/2007 | Knight |
| 7,427,544 B2 | 9/2008 | Oishi |
| 7,784,268 B1 | 8/2010 | Greason et al. |
| 7,784,269 B1 * | 8/2010 | Greason ............ F02K 9/64 60/257 |
| 7,790,003 B2 | 9/2010 | Chiang et al. |
| 7,900,436 B2 | 3/2011 | Greene |
| 8,266,884 B1 * | 9/2012 | Baker ............... F23L 7/002 60/39.53 |
| 2002/0056762 A1 | 5/2002 | Kretschmer |
| 2002/0184875 A1 | 12/2002 | Knight |
| 2003/0005708 A1 | 1/2003 | Beck et al. |
| 2004/0148925 A1 * | 8/2004 | Knight ............... F02K 9/50 60/259 |
| 2004/0244360 A1 | 12/2004 | McMullen et al. |
| 2004/0250530 A1 | 12/2004 | McMullen et al. |
| 2005/0077341 A1 | 4/2005 | Larrieu et al. |
| 2007/0007879 A1 | 1/2007 | Bergman, Jr. et al. |
| 2008/0016846 A1 | 1/2008 | Spadaccini |
| 2008/0095652 A1 | 4/2008 | Jiang |
| 2009/0013663 A1 | 1/2009 | Kim |
| 2010/0096491 A1 | 4/2010 | Whitelaw et al. |
| 2010/0205933 A1 | 8/2010 | Mungas et al. |
| 2010/0218482 A1 | 9/2010 | Greason et al. |
| 2010/0252686 A1 | 10/2010 | Raymond et al. |
| 2010/0326044 A1 | 12/2010 | Greason et al. |
| 2011/0005193 A1 | 1/2011 | Pavia et al. |

FOREIGN PATENT DOCUMENTS

| | | |
|---|---|---|
| JP | H10-77907 A | 3/1998 |
| JP | H10-288091 A | 10/1998 |
| JP | H11-229963 A | 8/1999 |
| JP | 2000-153416 A | 6/2000 |
| JP | 2000-176754 A | 6/2000 |
| JP | 2000-248994 A | 9/2000 |
| JP | 2000-320404 A | 11/2000 |
| JP | 2001-140698 A | 5/2001 |
| JP | 2001-207912 A | 8/2001 |
| JP | 2001-295612 A | 10/2001 |
| JP | 2002-195151 A | 7/2002 |
| JP | 2002-531748 A | 9/2002 |
| JP | 2004-100678 A | 4/2004 |
| JP | 2004-233044 A | 8/2004 |
| JP | 2004-332539 A | 11/2004 |
| JP | 2004-332540 A | 11/2004 |
| JP | 2004-332541 A | 11/2004 |
| JP | 2004-360702 A | 12/2004 |
| JP | 2005-002981 A | 1/2005 |
| JP | 2005-002984 A | 1/2005 |
| JP | 2005-003000 A | 1/2005 |
| JP | 2005-113683 A | 4/2005 |
| JP | 2005-146850 A | 6/2005 |
| JP | 2005-147120 A | 6/2005 |
| JP | 2005-147122 A | 6/2005 |
| JP | 2005-529030 A | 9/2005 |
| JP | 2007-332335 A | 12/2007 |
| JP | 2008-525712 A | 7/2008 |
| JP | 2008-240643 A | 10/2008 |
| JP | 2009-174318 A | 8/2009 |
| JP | 2009-191611 A | 8/2009 |
| JP | 2009-191612 A | 8/2009 |
| JP | 2009-540190 A | 11/2009 |
| JP | 2011-514462 A | 5/2011 |
| JP | 2012-511120 A | 5/2012 |
| JP | 2012-189010 A | 10/2012 |
| WO | 2011/030719 A1 | 3/2011 |

OTHER PUBLICATIONS

George P. Sutton et al.; "Liquid Propellant Rocket Engine Systems"; Rocket Propulsion Elements; 8th Edition; pp. 270-353; ISBN:978-0-470-08024-5.

An Office Action and Search Report, issued by the Chinese Patent Office dated Mar. 5, 2018, which corresponds to Chinese Patent Application No. 201480082137.4 and is related to U.S. Appl. No. 15/322,294.

The extended European search report issued by the European Patent Office dated May 3, 2018, which corresponds to European Patent Application No. 14902357.4-1007 and is related to U.S. Appl. No. 15/322,294.

* cited by examiner

DEVICE, SYSTEM, AND METHOD FOR PRESSURIZING AND SUPPLYING FLUID

TECHNICAL FIELD

The present invention relates to a device that pressurizes liquid to vapor pressure or higher by a heat source as an energy source placed in the system, to supply the pressurized liquid without conversion to kinetic energy or electrical energy by use of internal energy of gas itself obtained by vaporizing liquid in a system, and a system and a method using the same.

BACKGROUND ART

A process of vaporizing liquid by heat exchange is a technology widely and commonly utilized in a thermal power plant, a nuclear power plant, a boiler, and the like. High pressure gas obtained by heat exchange is used for driving of a turbine by internal energy of the high pressure gas, and is used for various purposes by changing an energy form to mechanical energy, namely, kinetic energy, or further electrical energy.

The internal energy of gas is, that is, dominated by an absolute temperature of the gas, and is determined by a product of pressure and capacity, and by the type of gas, in a vessel.

Gas obtained by vaporizing liquid is hereinafter referred to as "operative gas" or "pressurant", and liquid as a material for generating the operative gas is hereinafter referred to as "raw fluid".

Simply, it is easy to obtain gas by applying heat to liquid. However, when vaporization is performed across a vapor pressure line, there is a case where boiling phenomenon appears, air bubbles are generated on a heat exchanger wall, a heat exchange rate is significantly lowered and efficiency is greatly lowered, and cooling efficiency of a wall on a heat source side is lowered at the same time, so that a fault in a facility is caused.

Therefore, a technology of raising pressure (hereinafter referred to as "pressurizing (pressurization)" or "increasing pressure") preferably to a pressure state corresponding to a supercritical state and raising a temperature while avoiding boiling, when liquid as raw fluid of operative gas is supplied to a heat exchanger, is frequently used. Herein, the "supercritical" denotes a fluid state where pressure is critical pressure or higher, and a temperature exceeds a critical temperature, and the "pressure corresponding to a supercritical state" denotes a pressure state where pressure exceeds critical pressure.

Operative gas can be manufactured from supercritical fluid having the increased temperature by reduction in pressure in a evaporator. In a system for increasing the pressure of this raw fluid to pressure corresponding the supercritical state and supplying the raw fluid having the increased pressure to the heat exchanger, a mechanical device that employs kinetic energy or electrical energy as a power source and has a function of supplying fluid at a designated pressure is generally used. This device is hereinafter referred to as a "discharge device", a "mechanical pump" or a "pump".

This device can be driven by use of a separately provided power source or a power source using energy of manufactured operative gas which has been converted into a different energy form. Herein, conversion of the energy form denotes a process of converting thermal energy into mechanical energy, namely kinetic energy or electrical energy.

However, finally obtained high pressure operative gas itself actually has large internal energy. If this fluid can be utilized in a process of increasing the pressure of this fluid to supply the fluid having the increased pressure without conversion into an extra energy form such as electric power, a device having extremely high efficiency can be configured.

A system for increasing the pressure of a raw fluid itself, or of another fluid represented by propellant in a rocket engine, of operative gas housed in a vessel (hereinafter referred to as a "tank") on a system and supplying the fluid at the same time by use of the pressure of the operative gas stored in the vessel, that is, the internal energy of the operative gas is referred to as a "pressurizing and supplying system", unlike a mechanical pump system.

However, in many cases, though the pressure of the operative gas is high, the pressure of the high pressure operative gas is relatively low compared to the objective fluid in a supercritical state, and therefore direct utilization of the operative gas is not employed in a pressure increasing process of raw fluid, and a low-efficiency mechanical pump system for converting an energy form with a conversion loss is still employed. As a result, not only lowering of efficiency but also complication of the system are caused.

Therefore, particularly in a moving body, the system becomes an inefficient supply system, and increase in the mass of the system or the device, or lowering of efficiency of the system or the device is caused.

Hereinafter, related conventional technologies will be briefly described.

Japanese Patent Laid-Open No. 2009-191612 "VARIOUS ENERGY CONSERVATION CYCLE COMBINED ENGINE"

Japanese Patent Laid-Open No. 2009-191611 "VARIOUS ENERGY CONSERVATION CYCLE COMBINED ENGINE"

Japanese Patent Laid-Open No. 2009-174318 "VARIOUS ENERGY CONSERVATION CYCLE COMBINED ENGINE"

Thermal energy is once converted into kinetic energy by a turbine, and therefore the above inventions are completely different from the present invention.

Japanese Patent Laid-Open No. 2005-147122 "VARIOUS ROCKET COMBINED ENGINE"

Japanese Patent Laid-Open No. 2005-147120 "VARIOUS ENERGY CONSERVATION CYCLE COMBINED ENGINE"

Japanese Patent Laid-Open No. 2005-146850 "VARIOUS ROCKET ENGINE COMBINED ENGINE"

A propellant pressurizing and supplying system is not described. Intake supply by an atomizer is employed, and therefore the above inventions are completely different from the present invention.

Japanese Patent Laid-Open No. 2005-113683 "VARIOUS FULL ROTOR BLADE STEAM GAS TURBINE COMBINED ENGINE"

Japanese Patent Laid-Open No. 2005-002984 "VARIOUS VERTICAL FULL ROTOR BLADE STEAM GAS TURBINE COMBINED ENGINE"

Japanese Patent Laid-Open No. 2005-002981 "VARIOUS FULL ROTOR BLADE STEAM GAS TURBINE COMBINED ENGINE"

Thermal energy is once converted into kinetic energy by a turbine, and therefore the above inventions are completely different from the present invention.

Japanese Patent Laid-Open No. 2004-332541 "VARIOUS ENERGY CONSERVING CYCLE ENGINES"

The pressurizing and supplying system is not employed, and therefore the above invention is completely different from the present invention.

Japanese Patent Laid-Open No. 2004-332540 "VARIOUS FULL ROTOR BLADE STEAM GAS TURBINE COMBINED ENGINE"

Thermal energy is once converted into kinetic energy by a turbine, and therefore the above invention is completely different from the present invention.

Japanese Patent Laid-Open No. 2004-332539 "VARIOUS ENERGY CONSERVING CYCLE ENGINES"

The pressurizing and supplying system is not employed, and therefore the above invention is completely different from the present invention.

Japanese Patent Laid-Open No. 2004-100678 "VARIOUS FULL ROTOR BLADE STEAM GAS TURBINE COMBINED ENGINE"

Japanese Patent Laid-Open No. 2001-295612 "VARIOUS STEAM/GAS COMBINED TURBINE ENGINES"

Thermal energy is once converted into kinetic energy by a turbine, and therefore the above inventions are completely different from the present invention.

Japanese Patent Laid-Open No. 2007-332335 "COKE CREATING APPARATUS INCLUDING FULLY AUTOMATED, WASTE TIRE, AND WHOLE WASTE RUBBER LIQUEFACTION THROUGH EXTRACTION OF OIL COMPONENT"

The pressurizing and supplying system is not employed, and therefore the above invention is completely different from the present invention.

Japanese Patent Laid-Open No. 2004-233044 "METHOD OF MANUFACTURING ACTIVE COOLING PANEL USING THERMOSTRUCTURAL COMPOSITE MATERIAL"

A heat exchanger wall surface structure is employed, and a supplying system is not employed, and therefore the above invention is completely different from the present invention.

Japanese Patent Laid-Open No. 2000-248994 "PROPELLANT PRESSURIZING DEVICE FOR ROCKET ENGINE"

The above invention is related to a pressurizing and supplying system of a rocket engine, but the major premise of the above invention is that gas to be pressurized is installed, and therefore is basically different from the present invention.

Japanese Patent Laid-Open No. 2000-176754 "ASSEMBLING DEVICE FOR HEAT EXCHANGER"

Japanese Patent Laid-Open No. 2000-153416 "HEAT EXCHANGER ASSEMBLING DEVICE"

These inventions are related to a heat exchanger manufacturing device, and therefore the above inventions are completely different from the present invention in the subject matters.

National Publication of International Patent Application No. 2011-514462 "METHOD AND DEVICE ENABLING A ROCKET ENGINE PUMP TO BE DRIVEN BY AN INTERNAL COMBUSTION ENGINE"

The above invention is a "device including air intake internal combustion engine operated by an oxidizing agent, air/hydrocarbon base mixed gas, wherein supply of the oxidizing agent and fuel is performed by a circuit and a tank separated from a propellant tank of a rocket engine", and therefore the above invention is completely different from a method for vaporizing and supplying liquid inert gas as raw fluid, performed by the present invention.

National Publication of International Patent Application No. 2008-525712 "KNEADING AND DISPLACING METHOD AND MECHANISM FOR FLUID MACHINERY AND THE USE"

The above invention does not employ pressurizing and supplying system, and therefore the above invention is completely different from the present invention.

National Publication of International Patent Application No. 2005-529030 "MOTORCYCLE ENGINE" The above invention is related to an installation form of a motorcycle engine, and therefore the above invention is completely different from the present invention.

Japanese Patent Laid-Open No. 2012-189010 "NOZZLE FOR LIQUID ROCKET ENGINE"

The above invention employs film cooling to a nozzle inner surface, and therefore the above invention is quite different from the present invention.

Japanese Patent Laid-Open No. 2005-003000 "ASSEMBLING METHOD FOR ENGINE AND ROCKET ENGINE COMBUSTION CHAMBER"

The above invention is related to a transfer region manufacture between a combustion chamber and a nozzle skirt section, and therefore the above invention is quite different from the supplying system of the present invention.

Japanese Patent Laid-Open No. 2004-360702 "ROCKET ENGINE COMBUSTION CHAMBER AND ITS FORMING METHOD"

The above invention is related to a combustion chamber forming method, and therefore the above invention is quite different from the supplying system of the present invention.

Japanese Patent Laid-Open No. 2002-195151 "PLASMA GAS PROPULSION DEVICE"

The above invention is related to efficient irradiation of a laser beam, and therefore the above invention is quite different from the supplying system of the present invention.

Japanese Patent Laid-Open No. 2001-207912 "DRIVING METHOD OF ROCKET ENGINE AND ROCKET ENGINE USING IT"

The above invention employs combustion of combustion gas in a combustion device after driving of a turbo pump, and therefore the above invention is quite different from the supplying system of the present invention.

Japanese Patent Laid-Open No. 2001-140698 "CONSTITUTION AND METHOD FOR COOLING LIQUID FUEL ROCKET ENGINE SYSTEM"

The above invention is related to a system for installing pressing gas in a cooling method by helium, and therefore the above invention is quite different from the supplying system of the present invention.

Japanese Patent Laid-Open No. 2000-320404 "NOZZLE FOR ROCKET ENGINE AND MANUFACTURE THEREOF"

The above invention is related to a regenerative cooling nozzle, and therefore the above invention is quite different from the supplying system of the present invention.

Japanese Patent Laid-Open No. 11-229963 "EXPANDER CYCLE STRUCTURE IN LIQUID ROCKET ENGINE"

The above invention uses a mechanical pump, and therefore the above invention is quite different from the supplying system of the present invention.

Japanese Patent Laid-Open No. 10-288091 "rocket engine"

The above invention is related to a hybrid rocket, but is not related to a supplying system, and therefore the above invention is quite different from the supplying system of the present invention.

Japanese Patent Laid-Open No. 10-077907 "SIZE STABLE THROAT INSERT OF ROCKET THRUSTER"

The above invention is related to throat insert, and therefore the above invention is quite different from the supplying system of the present invention.

National Publication of International Patent Application No. 2012-511120 "REGENERATIVELY COOLED POROUS MEDIA JACKET"

The above invention is related to a regenerative cooler, and therefore the above invention is quite different from the supplying system of the present invention.

National Publication of International Patent Application No. 2009-540190 "METHANE ENGINE FOR ROCKET PROPULSION"

The above invention uses an engine having a mechanical pump, and therefore the above invention is quite different from the supplying system of the present invention.

National Publication of International Patent Application No. 2002-531748 "NOZZLE STRUCTURE FOR ROCKET NOZZLES HAVING COOLED NOZZLE WALL"

The above invention is related to a regenerative cooler itself, and therefore the above invention is quite different from the supplying system of the present invention.

WO2011/030719 "ROCKET ENGINE SYSTEM FOR REALIZING HIGH-SPEED RESPONSE"

The above invention uses a mechanical pump, and therefore the above invention is quite different from the supplying system of the present invention.

U.S. Pat. No. 7,790,003 "Method for magnetron sputter deposition"

The above invention employs a vapor deposition device, and therefore the above invention is quite different from the supplying system of the present invention.

U.S. Pat. No. 7,784,268 "Partial superheat cycle for operating a pump in a rocket system"

The above invention describes a method for driving a motor for driving a mechanical pump by gas generated by exchanging heat of an oxidizing agent, and therefore the above invention is quite different from the supplying system of the present invention.

U.S. Pat. No. 7,082,750 "Pressurizer for a rocket engine"

In the above invention, a pressure increasing and supplying machine for supplying propellant by driving a piston by a pressurizing body (pressurant) is claimed. At a glance, the reciprocating piston appears to be similar to one of claims of the present invention. However, the pressure increasing and supplying machine in the above invention supplies propellant, an object to be supplied in a supplier employed in the present invention is a pressurizing body (pressurant) that pressurizes a vessel (tank) storing propellant (fuel, oxidizing agent), and is not propellant, and therefore assumed engine systems themselves are basically different. Additionally, the greatest feature of a sequential pressure increasing and supplying machine (charger) in the present invention is that the pressurizing body (pressurant) itself is steam generated from fluid discharged from the supplying machine. That is, pressure increase and supply are performed by operative gas itself, which is the feature of the present invention and is not disclosed in the above invention. Additionally, in the present invention, even when the pressurizing body (pressurant) has low pressure, an area ratio of a piston is changed, and pressure increase is enabled. This point is not disclosed in the above invention. Accordingly, the present invention is basically different from the above invention.

U.S. Pat. No. 6,834,493 "System for reducing pump cavitation"

The above invention employs cavitation in a mechanical pump, and therefore the above invention is quite different from the supplying system of the present invention.

U.S. Pat. No. 6,658,863 "Airborne gas storage and supply system"

While the title of the above invention is a gas storage and supply system, a system for using liquid helium as supercritical fluid to hold gas in the state, and obtaining gas by use of a heat exchanger to supply the gas is claimed. Particularly, in the above literature, the claim to the rocket is described as follows:

26. A method of providing a source of pressurized gas aboard a rocket powered launch vehicle, comprising the steps of: providing a storage bottle which is configured to receive and hold a stored gas at a predetermined pressurization and includes an internally mounted heating device configured to transfer heat to the stored gas; preparing the storage bottle for receiving an amount of the stored gas; pumping stored gas into the bottle from a remotely located source at a predetermined temperature until a desired pressure are attained; allowing amounts of the stored gas to exit the bottle to be directed to at least one remote location; and as the stored gas exits the bottle, employing the internally mounted heating device to control temperature of the stored gas to affect pressure of the stored gas.

27. The method of claim 26 wherein the stored gas is supercritical helium at a density of at least 7 lbs/ft.sup.3.

In the contents, pressurized gas is installed as liquid, heat obtained on the rocket is extracted through a heat exchanger, and gas having desired pressure is obtained. This concept itself is a concept which an expert can easily reach, and is described in the present invention as a background.

In the above invention, existence of a vessel housing supercritical liquid helium is previously assumed. Therefore, a mechanism of pressure increase for obtaining the supercritical fluid is not clarified. In the present invention, this pressure increase is performed by low pressure gas generated by itself, and therefore the above invention is completely different from the present invention.

U.S. Patent No. 20110005193 "Method and apparatus for simplified thrust chamber configurations"

U.S. Patent No. 20100326044 "METHOD FOR COOLING ROCKET ENGINES"

U.S. Patent No. 20100218482 "SYSTEM AND METHOD FOR COOLING ROCKET ENGINES"

These inventions are useful for pressurization of propellant by use of a heat exchanger, which are common. As a result, in these inventions, a system for pressurizing propellant by gas from the propellant is claimed. In the present invention, using inert gas generated from raw fluid by a heat exchanger as a pressurizing body (pressurant) of propellant, and employing a system for increasing and supplying pressure by the pressurizing body (pressurant) itself are claimed, and therefore the above inventions are different from the present invention.

U.S. Patent No. 20100096491 "ROCKET-POWERED ENTERTAINMENT VEHICLE"

The above invention does not mention the pressurizing and supplying system, and therefore the above invention is quite different from the present invention.

U.S. Patent No. 20080016846 "System and method for cooling hydrocarbon-fueled rocket engines"

The above invention is related to a mechanical pump, and therefore the above invention is quite different from the supplying system of the present invention.

U.S. Pat. No. 6,457,306

The above invention is related to supply by a mechanical pump, and therefore the above invention is quite different from the supplying system of the present invention.

U.S. Pat. No. 7,900,436 "Gas-generator augmented expander cycle rocket engine"

The above invention is related to supply by a mechanical pump, and therefore the above invention is quite different from the supplying system of the present invention.

U.S. Pat. No. 5,219,270 "Reaction barrel with rocket nozzles in staggered alignment and connecting ducts of unequal length" The above invention is related to supply by a mechanical pump, and therefore the above invention is quite different from the supplying system of the present invention.

U.S. Pat. No. 4,583,362 "Expander-cycle, turbine-drive, regenerative rocket engine"

The above invention mentions that an oxidizing agent is brought into a supercritical state, and aims at suppression of boiling. As to these points, a part of a technical problem of the above invention is common with the present invention. However, a mechanical supply means is claimed, and therefore the above invention is quite different from the supplying system of the present invention.

CITATION LIST

Patent Literature

Patent Literature 1: Japanese Patent Laid-Open No. 2009-191612
Patent Literature 2: Japanese Patent Laid-Open No. 2009-191611
Patent Literature 3: Japanese Patent Laid-Open No. 2009-174318
Patent Literature 4: Japanese Patent Laid-Open No. 2005-147122
Patent Literature 5: Japanese Patent Laid-Open No. 2005-147120
Patent Literature 6: Japanese Patent Laid-Open No. 2005-146850
Patent Literature 7: Japanese Patent Laid-Open No. 2005-113683
Patent Literature 8: Japanese Patent Laid-Open No. 2005-002984
Patent Literature 9: Japanese Patent Laid-Open No. 2005-002981
Patent Literature 10: Japanese Patent Laid-Open No. 2004-332541
Patent Literature 11: Japanese Patent Laid-Open No. 2004-332540
Patent Literature 12: Japanese Patent Laid-Open No. 2004-332539
Patent Literature 13: Japanese Patent Laid-Open No. 2004-100678
Patent Literature 14: Japanese Patent Laid-Open No. 2001-295612
Patent Literature 15: Japanese Patent Laid-Open No. 2007-332335
Patent Literature 16: Japanese Patent Laid-Open No. 2004-233044
Patent Literature 17: Japanese Patent Laid-Open No. 2000-248994
Patent Literature 18: Japanese Patent Laid-Open No. 2000-176754
Patent Literature 19: Japanese Patent Laid-Open No. 2000-153416
Patent Literature 20: National Publication of International Patent Application No. 2011-514462
Patent Literature 21: National Publication of International Patent Application No. 2008-525712
Patent Literature 22: National Publication of International Patent Application No. 2005-529030
Patent Literature 23: Japanese Patent Laid-Open No. 2012-189010
Patent Literature 24: Japanese Patent Laid-Open No. 2005-003000
Patent Literature 25: Japanese Patent Laid-Open No. 2004-360702
Patent Literature 26: Japanese Patent Laid-Open No. 2002-195151
Patent Literature 27: Japanese Patent Laid-Open No. 2001-207912
Patent Literature 28: Japanese Patent Laid-Open No. 2001-140698
Patent Literature 29: Japanese Patent Laid-Open No. 2000-320404
Patent Literature 30: Japanese Patent Laid-Open No. 11-229963
Patent Literature 31: Japanese Patent Laid-Open No. 10-288091
Patent Literature 32: Japanese Patent Laid-Open No. 10-077907
Patent Literature 33: National Publication of International Patent Application No. 2012-511120
Patent Literature 34: National Publication of International Patent Application No. 2009-540190
Patent Literature 35: National Publication of International Patent Application No. 2002-531748
Patent Literature 36: WO2011/030719
Patent Literature 37: U.S. Pat. No. 7,790,003
Patent Literature 38: U.S. Pat. No. 7,784,268
Patent Literature 39: U.S. Pat. No. 7,082,750
Patent Literature 40: U.S. Pat. No. 6,834,493
Patent Literature 41: U.S. Pat. No. 6,658,863
Patent Literature 42: U.S. Patent No. 20110005193
Patent Literature 43: U.S. Patent No. 20100326044
Patent Literature 44: U.S. Patent No. 20100218482
Patent Literature 45: U.S. Patent No. 20100096491
Patent Literature 46: U.S. Patent No. 20080016846
Patent Literature 47: U.S. Pat. No. 6,457,306
Patent Literature 48: U.S. Pat. No. 7,900,436
Patent Literature 49: U.S. Pat. No. 5,219,270
Patent Literature 50: U.S. Pat. No. 4,583,362

Non Patent Literature

Rocket Propulsion Elements, 8th Edition, George P. Sutton, Oscar Biblarz, ISBN: 978-0-470-08024-5

SUMMARY OF INVENTION

Technical Problem

A flying object or the like using liquid as propellant (hereinafter a rocket) mechanically supplies high pressure propellant to a combustion chamber, and implements high pressure combustion. In a rocket engine, reducing the weight of a means for supplying this propellant at high pressure as much as possible is the most important design condition. Therefore, a power source of this supply means is not installed as a separate device, and a system for employing, as a power source, a heat source as surplus energy obtained from a combustor, and driving a mechanical pump such as a rotary machine through conversion into kinetic energy is generally employed.

However, discharge performance required for the above mechanical pump is significantly high, and durability is hardly obtained, so that as a matter of fact, it is generally difficult to repeatedly drive the rocket engine. This is a maximum factor causing disposing of a space transport means and increase in transport cost.

As a simple system for supplying propellant to the rocket engine, particularly in a small rocket or the like, the above "pressurizing and supplying system" for pressurizing a tank storing the propellant by high pressure operative gas, and supplying the propellant to a combustion chamber is conventionally used.

This is equivalent to replacement of performance of the mechanical pump by pressure resistance of a pressure vessel, and any complicated mechanism is not required, and therefore this has an advantage in durability and is a system for implementing repeated driving.

Conventionally, a system for installing high pressure operative gas for pressurization as different type of gas is generally employed. However, pressure resistant request with respect to the pressure vessel is not uniform with respect to a residual amount of propellant, extraordinary pressure resistance is required to the housing pressure vessel, and excessive increase of the mass of the vessel is caused. In other words, many problems in practicability, for example, sustainable propellant supply under a constant pressure resistant request condition is difficult, remain, any excellent advantage cannot be exerted, and application is restrictive except a small rocket.

Conventionally, a system for installing operative gas for pressurization in a liquid state of raw fluid is considered, and a system for obtaining high pressure operative gas for pressurization and supply by vaporizing the raw fluid through a heat exchanger on a machine is a naturally expected means.

Mostly, withstanding pressure required for a vessel for storing liquid does not largely exceed gas-liquid equilibrium condition, namely, vapor pressure of the liquid, and it is possible to reduce weight and obtain a uniform pressure resistant request condition. Additionally, a system for utilizing a heat source as surplus energy generated with combustion without installing another power source as an energy source for vaporization is employed, so that further weight reduction is enabled. This is one of systems capable of securing both weight reduction and durability which can be easily considered by a person skilled in a rocket engine technology.

However, in a system for supplying raw fluid at critical pressure or less in a process of vaporizing the liquid through the heat exchanger, heating is performed across the vapor pressure line, and boiling is caused, a heat exchange property is significantly lowered, and utilization of surplus energy influences cooling performance of a combustion chamber wall to cause damage at the same time, and therefore the application is difficult.

As a result, in manufacturing of operative gas, it is necessary to employ a system for increasing pressure up to pressure exceeding critical pressure to supply liquid as raw fluid to a heat exchanger, and heating the liquid until the liquid is brought into a supercritical state, and thereafter reducing the pressure in a evaporator to obtain high pressure operative gas which performs the above pressurization and supply. Such a method is an operative gas manufacturing means common to a power plant or boiler technology, vaporizing through the heat exchange as described in the background art. (FIG. 1)

In this figure, the most direct method for manufacturing operative gas from raw fluid at a target temperature and at target pressure is Step 1 of boiling the raw fluid across a vapor pressure line. However, in Step 1, efficiency of heat exchange is low and cooling performance is lowered, so that there is a risk that a wall of the heat exchanger is damaged. Therefore, a system for increasing the pressure of the raw fluid of the operative gas once until the pressure exceeds critical pressure (Step 2), increasing the temperature of the raw fluid of the operative gas through the heat exchanger (Step 3) to manufacture supercritical fluid and reducing the pressure of the supercritical fluid, that is, manufacturing desired operative gas through a evaporator (Step 4) is employed. The present invention is a device for implementing a process of Step 2, wherein the pressure increase is performed by the manufactured operative gas with lower pressure itself. As a matter of course, the mass of the operative gas required for this step has to be less than the mass of the raw fluid transported in Step 2.

While in the above pressure increasing means for ground use, a power source can be separately secured, in a moving body such as a rocket, a power source for the pressure increasing means is desirably supplied by a heat source as surplus energy generated by combustion in order to reduce the weight. The above point is a difference.

One of systems for securing surplus energy through conversion into a different energy form is a mechanical pump in which thermal energy generated by a rotary machine is utilized after once converted into kinetic energy. However, as described above, difficult points in weight reduction and securement of durability remain.

In the pressurizing and supplying system, internal energy of generated high pressure operative gas itself becomes a power source, and therefore it is one of ultimate pressure increasing means to obtain a function of increasing the pressure up to pressure corresponding to a supercritical condition by directly utilizing the internal energy.

However, conventionally, the generated high pressure operative gas is obtained by further reducing the pressure of the supercritical fluid, and therefore the pressure is naturally lower than critical pressure, and therefore a means for securing the mass flow rate at super high pressure and supplying operative gas by this low pressure fluid has never implemented without conversion of the energy form because of a technical reason.

Because of a similar technical problem, also in an operative gas manufacturing system using a heat exchanger for ground use, there is no solution as the above pressure increasing method other than use of the mechanical pump. (FIG. 1)

Solution to Problem

First, a heat source is used as energy, the pressure of supercritical fluid in a heat exchanger outlet is reduced by a evaporator, so that operative gas is manufactured. Then, the manufactured operative gas side is set to a low pressure fluid side, and the inlet side of the heat exchanger is set to a high pressure fluid side. Between the both sides, pistons having different diameters are provided. A large diameter side is set to a low pressure side, and a small diameter side is set to a high pressure side. This problem can be solved by a device that increases the pressure of raw fluid by operative gas itself by use of a device for raising pressure (increasing pressure)

(hereinafter referred to as "self-pressurizing") and supplies the raw fluid to the heat exchanger. (FIG. 2)

In this figure, in the present invention, the operative gas obtained by use of the pistons which mainly do not use kinetic energy as a power source (hereinafter referred to as "quasi-static") and have the different diameters is on the large diameter side, and the heat exchanger inlet side which is a side where high pressure is required is set to the small diameter side, and the pressure is increased while the mass flow rate is secured, by utilizing the fact that the density of the raw fluid is sufficiently larger than the density of the obtained operative gas.

In the storage vessel of the operative gas, a passive heat insulation means, or a positive heating means is provided if necessary, so that generation of reliquefication or the like is suppressed.

The raw fluid supplying device of this figure drives in only one direction to increase the pressure of the whole of the operative gas raw fluid vessel.

When the density of low pressure side fluid is the same as the density of high pressure side fluid, the strokes of the pistons are common, and therefore the flow rate is a reciprocal of a pressure increase ratio and is lowered even when the pressure can be increased. Accordingly, the mass flow rate cannot be maintained, and the raw fluid supplying device cannot continuously function.

However, when a product of the density of the high pressure side fluid and the area of the small diameter side piston is larger than a product of the density of the low pressure side fluid and the area of the large diameter side piston, high pressure side fluid is phase-changed or heated through the heat exchanger and the evaporator, and thereafter the density is lowered, so that operative gas is obtained, and the obtained operative gas can be used again as low pressure side fluid. Therefore, the raw fluid supplying device can continuously function as the pressurizing and supplying device. The operative gas itself increases the pressure of the raw fluid, and in the present invention, this process is referred to as self-pressurization.

Particularly, when gas that can be liquefied is used as the raw fluid of the operative gas, the low pressure side fluid is steam, that is, a gas phase. In a case where the high pressure side fluid is a liquid phase, the density can be largely changed with phase change, and therefore the raw fluid supplying device can maintain the mass flow rate, and sufficiently and continuously function as the pressurizing and supplying device.

In order to increase the pressure of the raw fluid, a form of increasing the pressure of the whole of the vessel storing the fluid is typically employed. However, the pressure resistance of the whole of this vessel needs to be secured, and therefore the vessel mass is increased.

Therefore, a method for repeatedly performing reciprocating motion of these pistons so as to sequentially pressurize the raw fluid little by little is employed, so that it is possible to reduce pressure resistant request to the vessel storing the liquid, and attain the weight reduction. (FIG. 3) In the present invention, conversion of the energy form into kinetic energy is not required, and therefore the driving speed of the reciprocating motion is not required, the reciprocating motion may be quasi-static motion. In the self-pressurizing and supplying device in this figure, the reciprocating motion is performed to sequentially increase the pressure of the operative gas raw fluid in order to avoid the increase in the pressure inside the whole of the operative gas vessel and to reduce the weight of the vessel.

Effects of Invention

This device performs quasi-static operation, and therefore is a pressure-increasing and supplying device for pumping propellant in a rocket and water in a power plant/boiler through operative gas without converting thermal energy applied to the heat exchanger into kinetic energy. According to this system, it is possible to greatly improve weight reduction and durability.

DESCRIPTION OF EMBODIMENTS

Embodiment 1

In the most direct embodiment, a device that is installed in a rocket, and is configured to be combined with a heat exchanger and a evaporator and to increase the pressure of raw fluid obtained by liquefying installed operative gas to supply the raw fluid by obtained operative gas itself, to a heat exchanger that manufactures operative gas for pressurizing tank housing propellant (both or one of fuel and an oxidizing agent) and supplying the propellant is configured. That is, this device not only performs self-pressurization but also has a function of supplying fluid while maintaining the mass flow rate at the same time. Hereinafter, this device is referred to as the "self-pressurizing and supplying device", including a function of not only increasing pressure but also supplying fluid.

Figure 1:
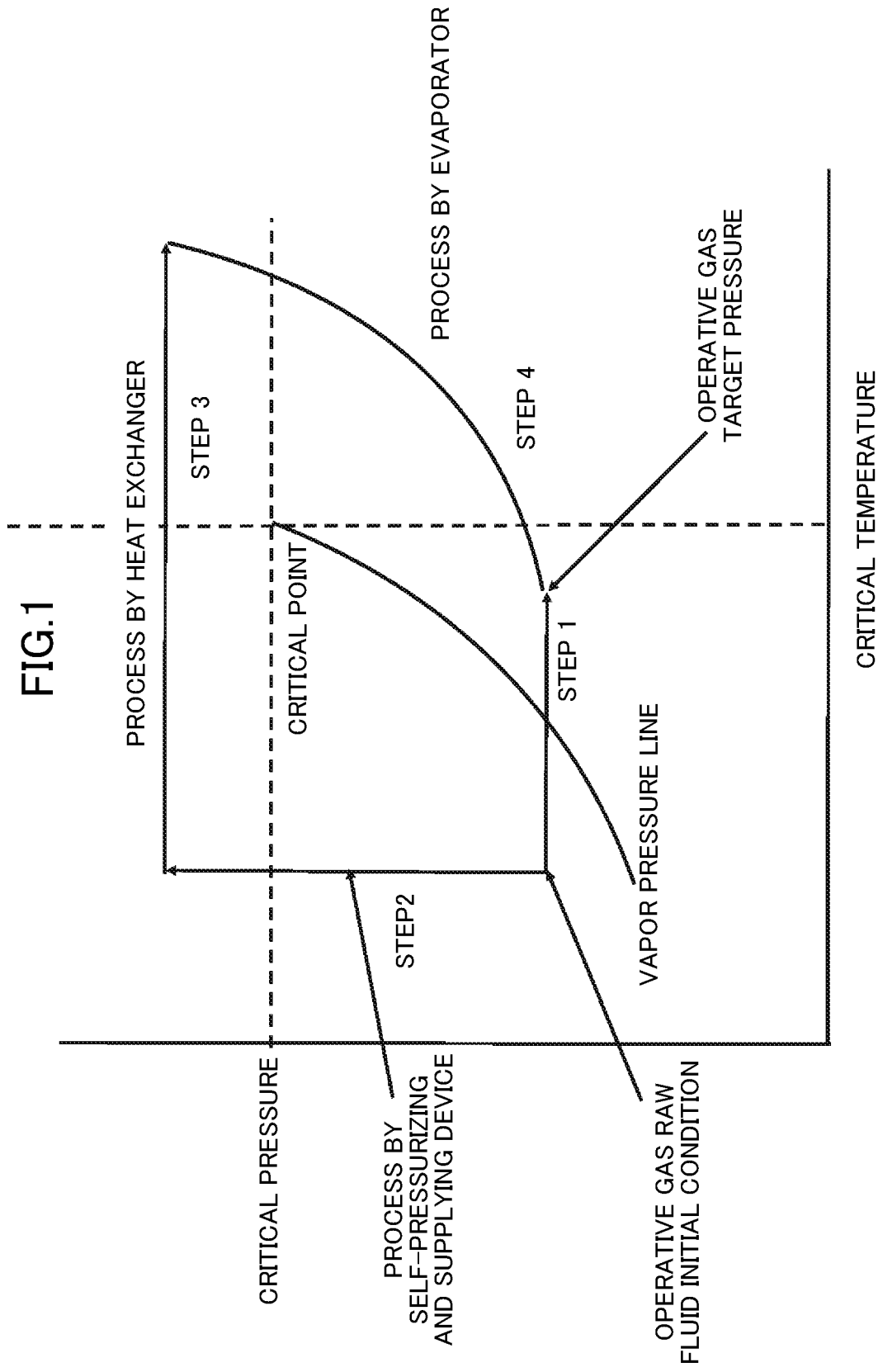
FIG. 1 is a diagram illustrating manufacture of operative gas, and pressure-temperature change.
Figure 2:
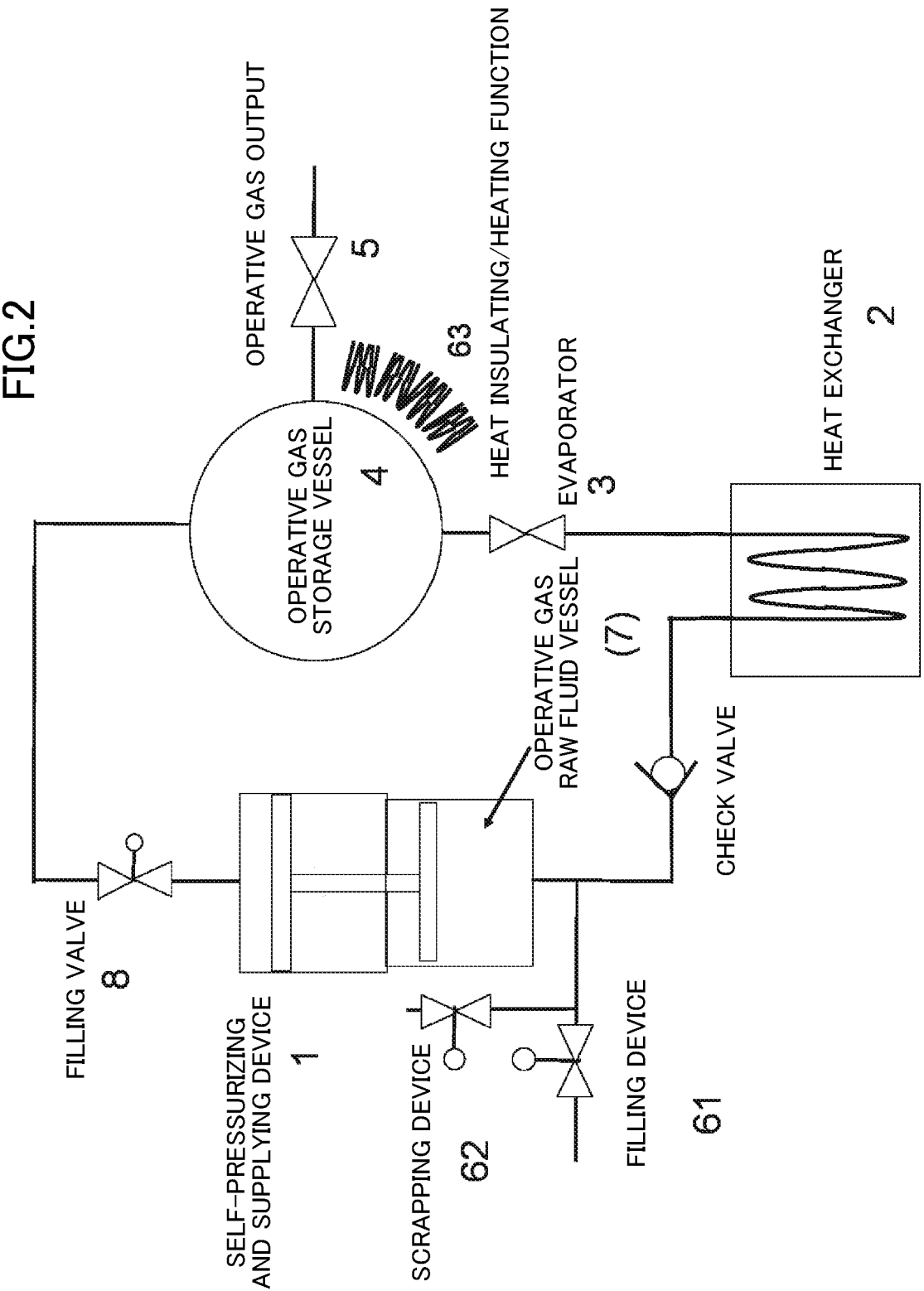
FIG. 2 is a diagram illustrating a static self-pressurization type supplying device and a pressurizing and supplying system.
Figure 3:
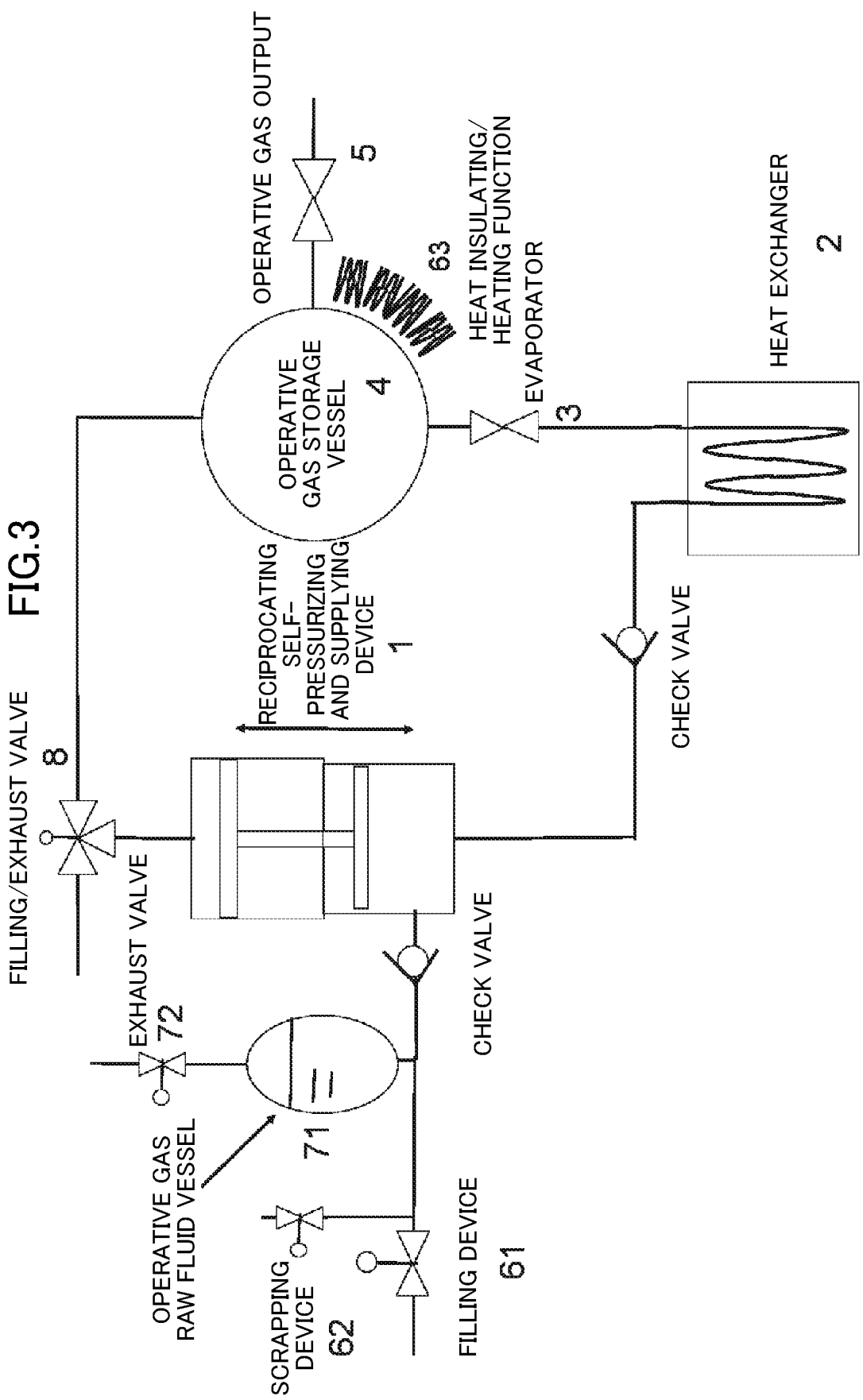
FIG. 3 is a diagram illustrating a reciprocating self-pressurization type supplying device and a pressurizing and supplying system.
Figure 4:
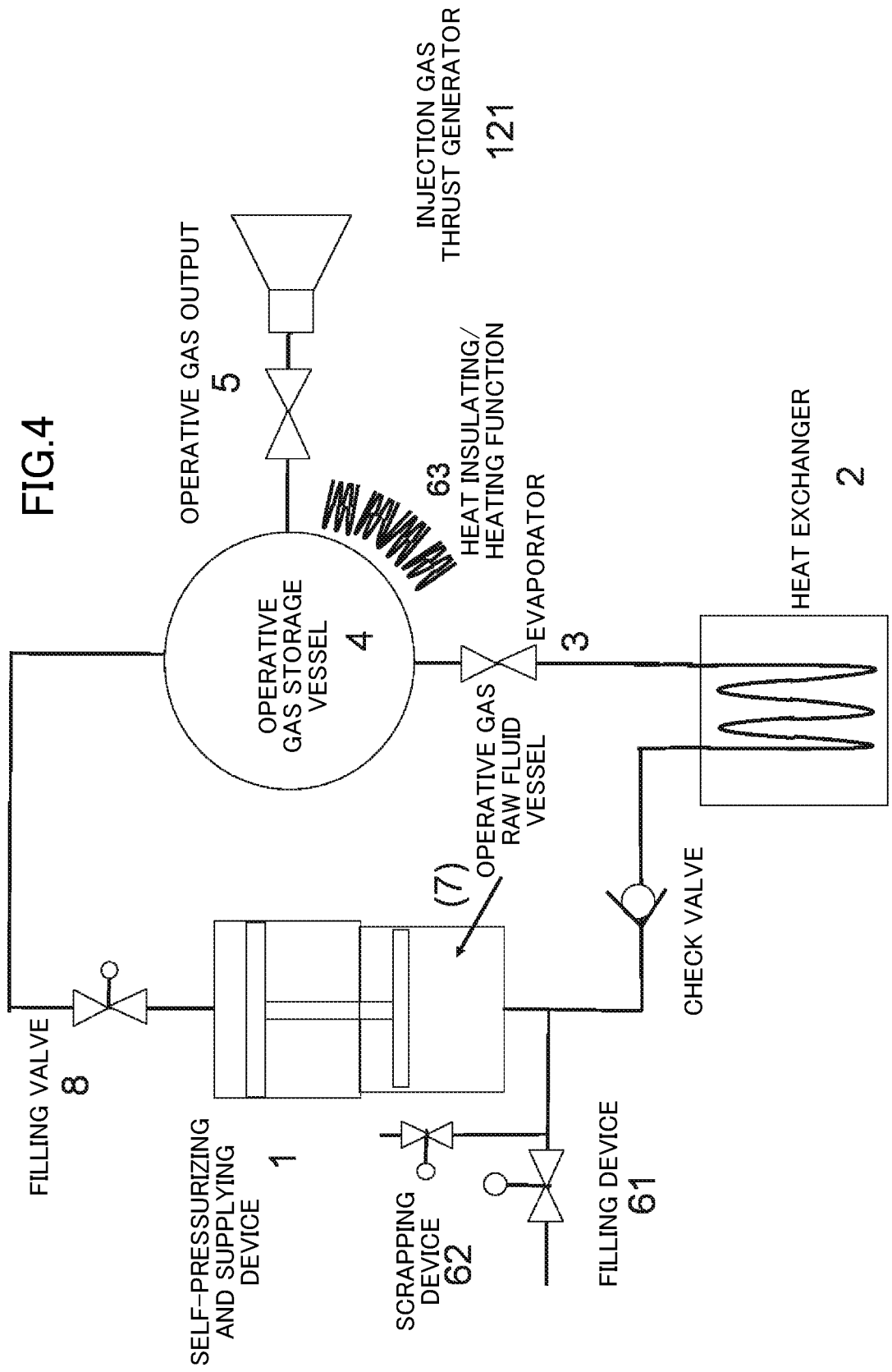
FIG. 4 is a diagram illustrating a thrust generator for heated steam or gas-liquid equilibrium gas injection, using the static self-pressurization type supplying device.

That is, this device is preferably implemented as a liquid rocket engine employing a system for pressurizing and supplying propellant (both or one of fuel and an oxidizing agent) by this operative gas to guide the propellant to a combustor. (FIG. 4)

This figure illustrates an application example to a rocket engine for pressurizing propellant (both or one of fuel and an oxidizing agent) tank by use of operative gas to guide the propellant to a combustor. A heat source of a heat exchanger is collected and obtained from a combustor wall, so that this causes increase of the temperature of raw fluid. Operative gas manufactured through a evaporator is guided to the self-pressurizing and supplying device, and is used to increase the pressure of the raw fluid. In this device, in a pressure increase process, a supplying system that can be utilized without changing the form of thermal energy, and has high efficiency with a simple configuration is configured.

Rocket engines employing a system for decomposing single liquid propellant with a catalyst (monopropellant system) also exist. Also in this type of engines, configuring a device for pressurizing and supplying propellant in a tank through operative gas is also one of potent embodiments.

Embodiment 2

Configuring a propulsion engine that is combined with a heat exchanger and a evaporator, injects operative gas itself obtained through the evaporator outside an airframe after the operative gas passes through the heat exchanger, and obtains reaction force by momentum conservation is also a potent embodiment.

An embodiment in which a system that is capable of avoiding boiling in a heat exchange process and maintaining a high heat exchange rate by this self-pressurizing and supplying device and injects obtained operative gas is potent.

Particularly, the configuration is simple as a small-thrust attitude or orbit control device for a flying object (a rocket, an artificial satellite), and therefore is a potent embodiment. (FIG. 4)

This figure illustrates application to a thrust generator with relatively small thrust, which injects obtained operative gas itself outside an airframe to obtain thrust force. In a heat exchange where heating is performed across a vapor pressure line, lowering of efficiency cannot be avoided. However, by the device and the method of the present invention, regardless of a simple configuration, a manufacturing process of supercritical fluid by this operative gas itself can be implemented, boiling or air bubble generation is avoided, and high heat exchange rate can be maintained.

While pressure sufficiently exceeding vapor pressure is applied to raw fluid by the self-pressurizing and supplying device, the operative gas obtained through the evaporator can be controlled to vapor pressure or less under the temperature, so that it is possible to prevent generation of mist at the time of injection which is a problem in a gas-liquid equilibrium injector.

Embodiment 3

Configuring a device for pressurizing and supplying propellant on a moving body such as a rocket and an artificial satellite, particularly, in an aerospace field is a potent embodiment, and an embodiment in which the self-pressurizing and supplying device of the present invention is incorporated as described below is practical.

As operative gas, inert and nontoxic gas capable of being installed in a gas that can be liquefied state is preferable, and a configuration of installing liquefied carbon dioxide gas, nitrous oxide, liquid nitrogen, or liquid helium is potent.

As propellant, combination of kerosene, ethanol, liquefied natural gas, liquefied propane gas, liquid hydrogen, hydrazine, monomethylhydrazine, or the like as fuel, and liquid oxygen, nitrous oxide, dinitrogen tetraoxide or nitric monoxide liquid mixture, or hydrogen peroxide as an oxidizing agent is a potent embodiment.

In a rocket engine configured of liquid hydrogen and liquid oxygen, a system that employs liquid helium as the operative gas is possible. Additionally, in a rocket engine configured of ethanol or hydrocarbon, and liquid oxygen, a system that employs liquid nitrogen as the operative gas is possible.

As operative gas to a thrust generator that injects heated steam or gas-liquid equilibrium gas outside an airframe by direct use of manufactured operative gas, utilization of alternative for chlorofluorocarbon having relatively high vapor pressure in addition to propane, butane, liquefied natural gas, nitrous oxide, carbon dioxide gas is a potent embodiment.

Figure 5:
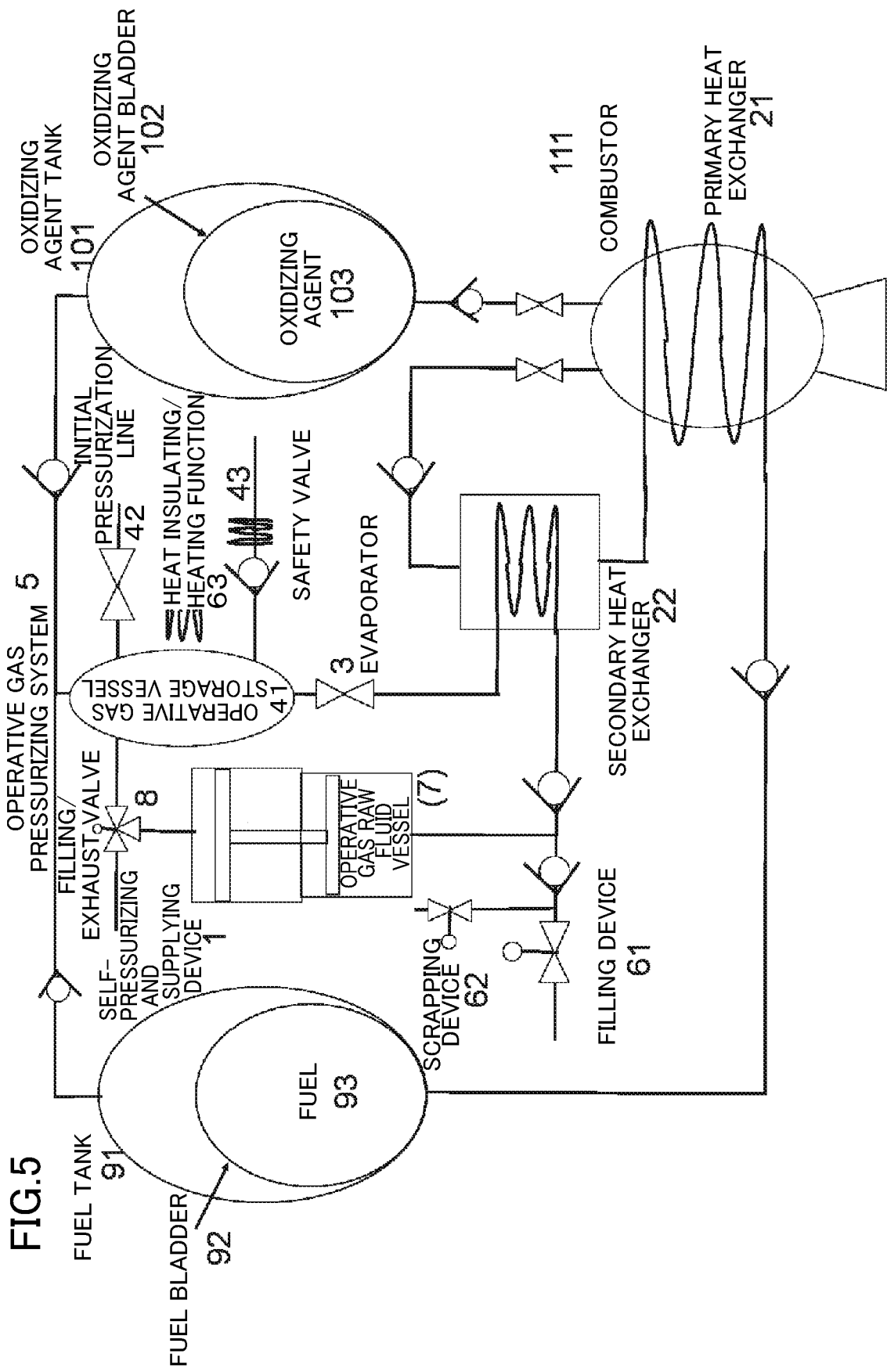
FIG. 5 is a diagram illustrating a configuration of a rocket engine using a static/reciprocating self-pressurization type supplying device.

Particularly, in combination of ethanol and nitrous oxide, a system for storing both fuel and an oxidizing agent or storing only fuel in a case of hydrazine in bag-like bladder is potent, and compressing a bag (bladder) having material compatibility by operative gas is excellent in practicability because exhaust efficiency can be enhanced. (FIG. 5)

Figure 6:
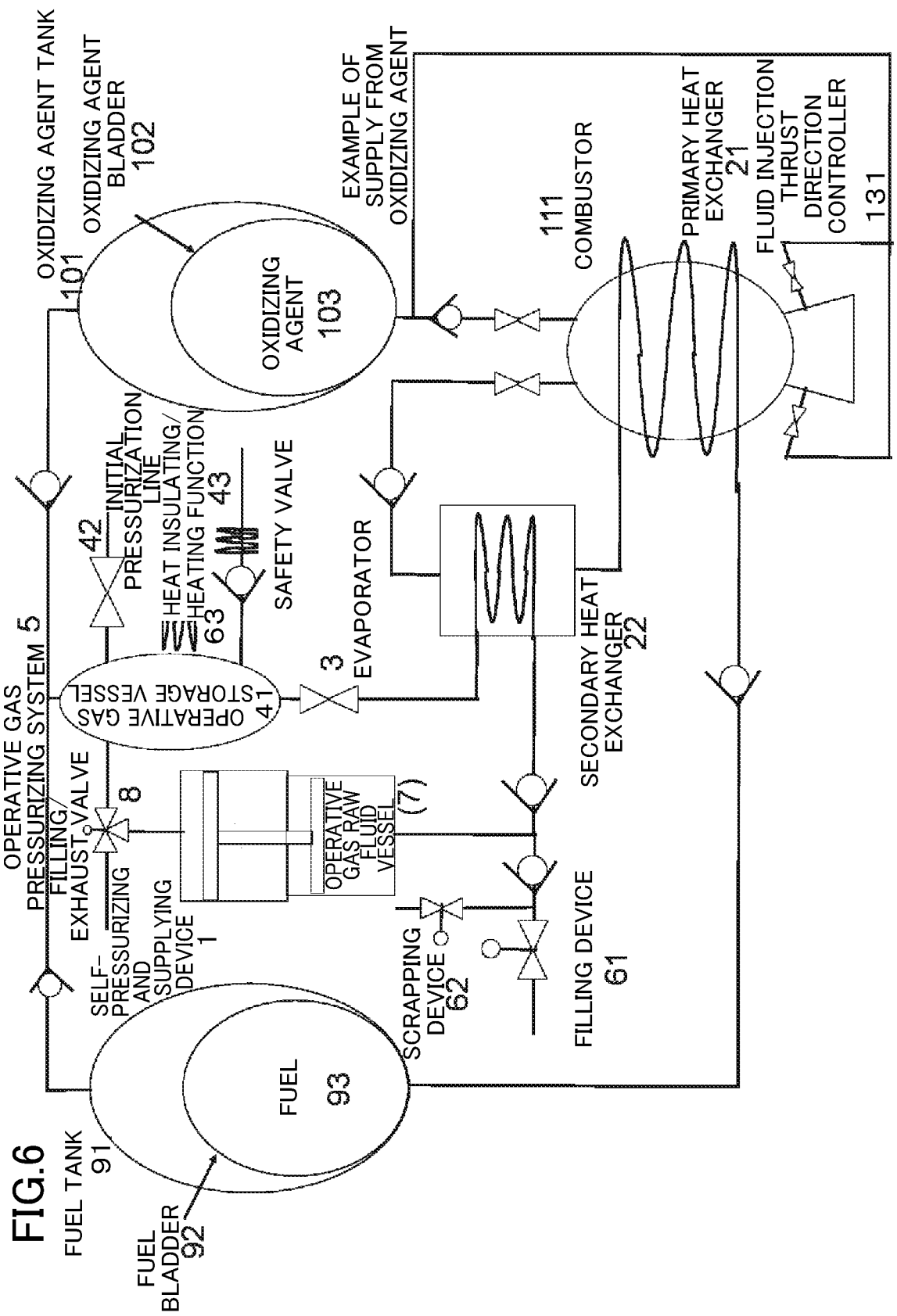
FIG. 6 is a diagram illustrating a configuration of a rocket engine with a thrust vectoring controller, using the static/reciprocating self-pressurization type supplying device.

In a form in which operative gas itself, or liquid phase fuel or oxidizing agent to be pressurized and supplied is injected into a nozzle by the operative gas, and thrust direction is controlled in accordance with combustion, a mechanism for inclining a combustor including the nozzle is unnecessary, and therefore a large effect in the weight reduction of the mechanism can be exerted. (FIG. 6)

In this figure, in a rocket engine using operative gas to pressurize and supply propellant, the pressure of propellant, particularly, an oxidizing agent fluid can be increased to high pressure, and therefore the device can be applied to a configuration of a thrust direction controller that injects the propellant into the nozzle to obtain lateral thrust. It is not necessary to transport the fluid to a deflection device in the thrust direction separately, and it is possible to eliminate a swiveling device of a rocket engine combustor, and therefore simplification of a rocket system is facilitated, and a rocket system having high efficiency is configured.

Figure 7:
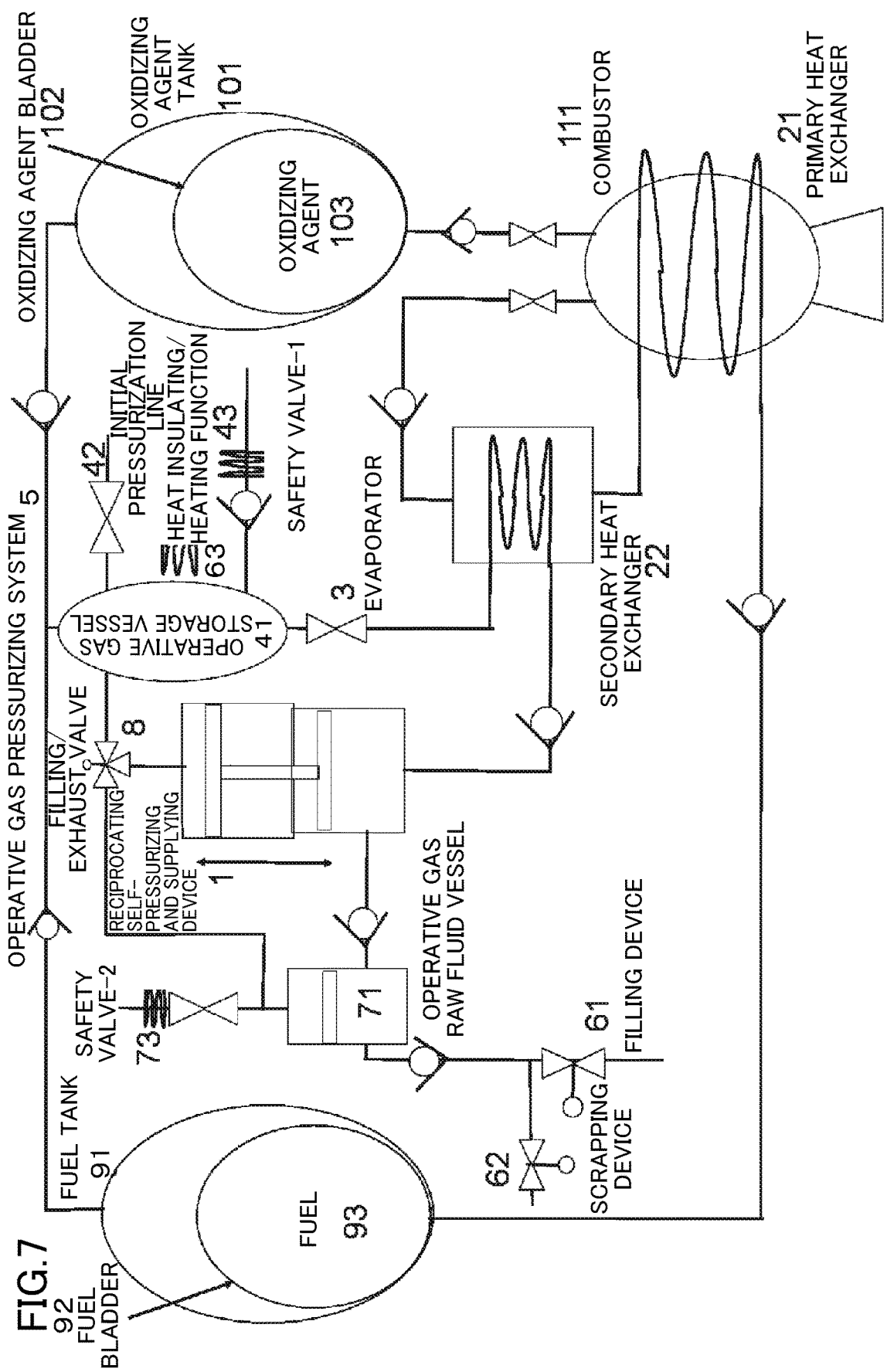
FIG. 7 is a diagram illustrating a configuration of a rocket engine with a supplying device for preventing cavitation of an operative gas raw fluid supplying system, using the static self-pressurization type supplying device.

In a form in which raw fluid is installed as gas that can be liquefied, a device for keeping a vessel for gas that can be liquefied at critical pressure or less and maintaining the pressure at pressure exceeding vapor pressure to suppress air bubble generation (cavitation) at the time of supplying the gas that can be liquefied is preferably configured, and a form of combination with a device for pressurizing and supplying gas that can be liquefied as a source of operative gas to a heat exchanger at pressure exceeding critical pressure by the manufactured operative gas itself is one of desired embodiments. (FIG. 7)

In order to guide raw fluid of operative gas to the self-pressurizing and supplying device, there is a method for using vapor pressure of raw fluid itself or another gas for pressurization. However, at the time of supplying the raw fluid to the self-pressurizing and supplying device, cavitation may be caused, and therefore effective supply capability may be lowered. The system illustrated in this figure is a system that preliminarily increases the pressure of raw fluid up to pressure exceeding vapor pressure once while being less than critical pressure, by obtained operative gas itself.

Figure 8:
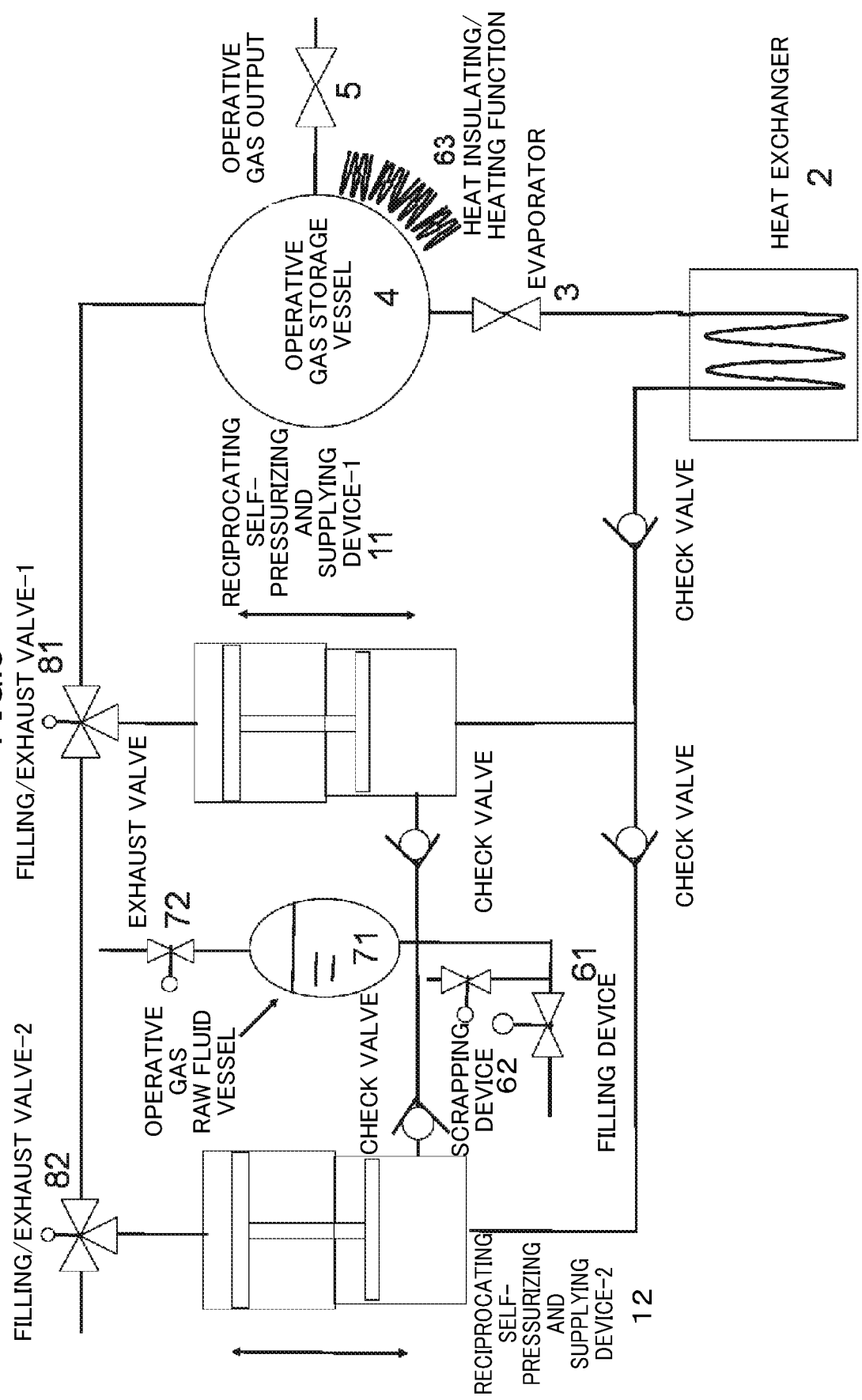
FIG. 8 is a diagram illustrating a multistage reciprocating self-pressurization type supplying device using operative gas exhaust in a supplying device again.

In a self-pressurizing and supplying device that repeatedly performs operation, a form in which a multistage self-pressurizing and supplying device that further contributes to pressurization by use of low pressure gas to be discharged is configured, which contributes to improvement of efficiency. (FIG. 8)

This figure illustrates a system for guiding operative gas to be exhausted to a second self-pressurizing and supplying device having pressure increase ratio obtained by further increasing an area ratio, in a lower pressure state, and supplying the operative gas in multi-stages, in a reciprocating self-pressurizing and supplying device.

Figure 9:
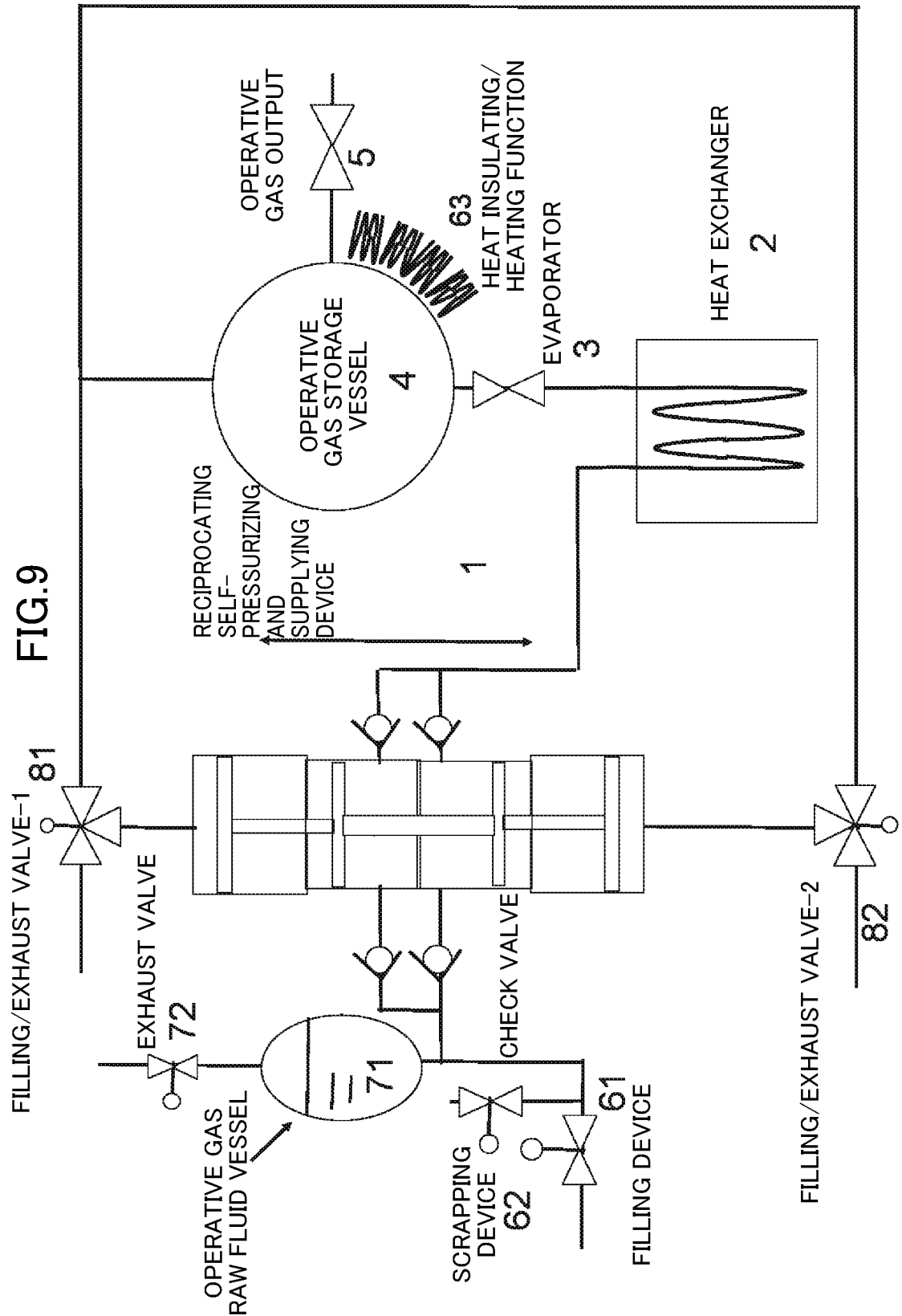
FIG. 9 is a diagram illustrating an example of a reciprocating supplying device, namely, a multistage supplying device for changing the phase of reciprocating motion, and suppressing the pulsation of the pressure of operative gas to be supplied, specifically, an example of a supplying device configured by changing the phase by 180 degrees in the horizontal direction.

In a reciprocating self-pressurizing and supplying device, a parallel supplying device that changes the phase of reciprocating motion, and suppresses pulsation of supplied pressure is configured, so that it is possible to suppress pulsation with the pressurization and the supply. (FIG. 9)

This figure similarly illustrates an example of a self-pressurizing and supplying device that changes the phase by 180 degrees in the horizontal direction, as an example of changing the phase of reciprocating motion of a self-pressurizing and supplying device having the same area ratio to suppress the pulsation of output pressure, in a reciprocating self-pressurizing and supplying device. This device increases the frequency of supply per unit time, and therefore contributes to reduction in size of the device.

Figure 10:
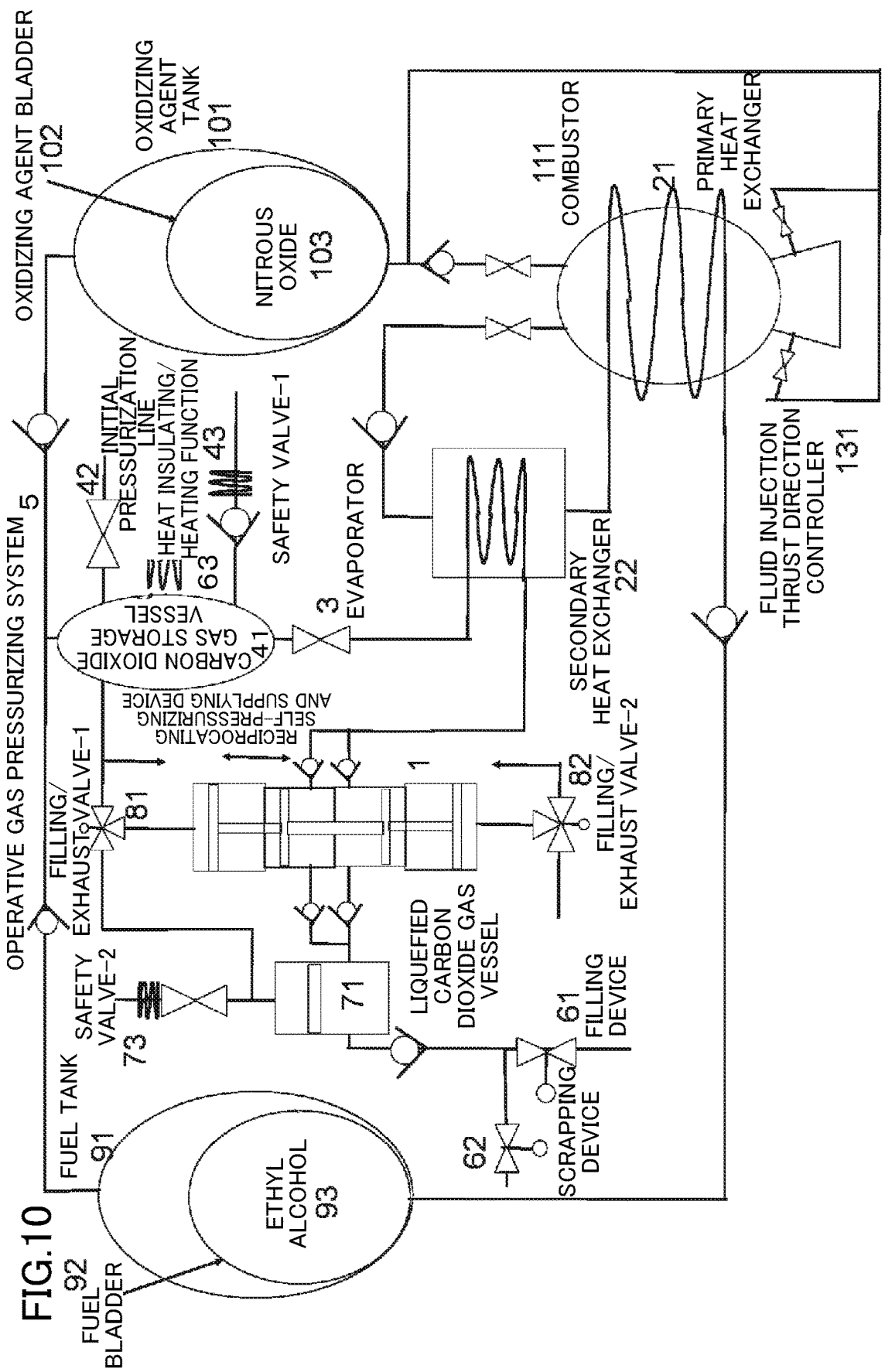
FIG. 10 is a diagram illustrating an embodiment of a rocket engine system configured by a reciprocating supplying device, using ethyl alcohol/nitrous oxide as a fuel/oxidizing agent, using carbon dioxide gas as operative gas, including a thrust vectoring function, and having a prevention function of cavitation at the time of supply of liquefied carbon dioxide gas.

By use of the reciprocating self-pressurizing and supplying device, an embodiment of a rocket system in which a mechanism for suppressing cavitation at the time of supply by preliminary pressurization to liquefied carbon dioxide gas and a thrust direction controller are combined with a rocket engine for pressurizing and supplying propellant by using ethyl alcohol as fuel, using nitrous oxide as an oxidizing agent, and using carbon dioxide gas as operative gas is illustrated. (FIG. 10)

As the most typical embodiment, an application example of a system for installing liquefied carbon dioxide gas in a rocket engine using ethanol and nitrous oxide as propellant and manufacturing operative gas on a rocket is illustrated. This figure illustrates an example of a reciprocating horizontal (pulsation free) self-pressurizing and supplying device.

INDUSTRIAL APPLICABILITY

In a power plant, a boiler or the like, a device for pressurizing and supplying water or gas that can be liquefied by manufactured gas itself can be configured. Particularly, in a moving body such as a ship and a vehicle, a power source for pressurization and supply needs to be reduced in size and weight, and therefore configuring a pressurizing and supplying system without changing an energy form is a potent embodiment.

REFERENCE SIGNS LIST 1 or 11, 12 self-pressurizing and supplying device
2 or 21, 22 heat exchanger
3 evaporator
4 or 41 operative gas storage vessel
42, 43 initial pressurization port, safety valve
5 operative gas output port, or propellant pressurizing system using operative gas
61, 62, 63 auxiliary accessory element. 61 denotes a filling device, 62 denotes a scrapping device, 63 denotes a heat insulating/heating function of an operative gas storage vessel.
7 or 71 operative gas raw fluid storage vessel.
72 exhaust port of operative gas raw fluid steam.
8 or, 81, 82 filling/exhaust valve in order to direct operative gas to a self-pressurizing and supplying device or exhaust from the self-pressurizing and supplying device
91, 92, 93 fuel tank, bladder for fuel, fuel fluid
101, 102, 103 fuel tank, bladder for fuel, fuel fluid
111 combustor
121 operative gas injector, thrust generator
131 fluid injection thrust direction controller.

The invention claimed is:

1. A device for pressurization and supply configured to:
   increase pressure of raw fluid as a material of gas, by
   the gas itself manufactured by reducing, by use of an evaporator, pressure of fluid whose pressure and temperature are increased after heat exchange by a heat exchanger with a heat source, while securing a mass flow rate by utilization of a density difference between the gas and the raw fluid; and
   supply the raw fluid with increased pressure to the heat exchanger.

2. The device according to claim 1, comprising an auxiliary device at the same time, the auxiliary device that employs a form in which the raw fluid is liquefied to be stored in a storage vessel, maintains the storage vessel at pressure exceeding vapor pressure, and supplies the raw fluid to the heat exchanger while suppressing generation of an air bubble.

3. The device according to claim 1, wherein
   pressure increase is performed by a mechanical discharge device in which a gas side for the pressure increase process is set to a low pressure side, an inlet side to the heat exchanger is set to a high pressure side, and conversion of an energy form of the gas into kinetic energy or electrical energy is not required.

4. The device according to claim 3, wherein
   pistons having different diameters are provided, the gas side for the pressure increase process is set to a large diameter side, the inlet side to the heat exchanger is set to a small diameter side, and the pistons perform pressure increase.

5. The device according to claim 4, wherein
   pressure of the raw fluid as the material of the gas for performing pressurization and supply is sequentially increased by reciprocating motion performed by the pistons.

6. The device according to claim 5, wherein
   pressure increase in multi-stages is performed by use of pistons having a further enhanced diameter ratio by use of low pressure gas discharged through the pressure increase process.

7. The device according to claim 5, wherein
   pressure increase is performed by use of parallel pistons in order to change a phase of reciprocating motion of each of the pistons, and suppress pulsation of supplied pressure, in the pressure increase process.

8. A device for pressurization and supply configured to:
   increase pressure of raw fluid as a material of gas, by the gas itself manufactured by reducing, by use of an evaporator, pressure of fluid whose pressure and temperature are increased after heat exchange by a heat exchanger with a heat source as a surplus heat source from a combuster or a thrust generation mechanism, or another installed heat source while securing a mass flow rate by utilization of a density difference between the gas and the raw fluid, and supply the raw fluid with increased pressure to the heat exchanger.

9. A system comprising:

a device for pressurization and supply configured to increase pressure of raw fluid and supply the raw fluid with increased pressure;

a heat exchanger with a heat source configured to increase, by heat exchange, temperature of the raw fluid with increased pressure supplied from the device for pressurization and supply; and an evaporator configured to manufacture a gas by reducing pressure of fluid whose pressure and temperature are increased after heat exchange by the heat exchanger;

wherein the device for pressurization and supply is configured to;

increase pressure of the raw fluid as a material of the gas, by the gas itself manufactured by reducing, by use of the evaporator, pressure while securing a mass flow rate by utilization of a density difference between the gas and the raw fluid, and supply the raw fluid with increased pressure to the heat exchanger.

10. The system according to claim 9, wherein the system is configured as a gas injection type attitude or orbit control system further comprising an injector for injecting the gas.

11. The system according to claim 9, wherein the fluid is water or a gas that can be liquefied.

12. A method comprising:

increasing pressure of raw fluid and supplying the raw fluid with increased pressure by a device for pressurization and supply;

increasing, by a heat exchanger with a heat source, by heat exchange, temperature of the raw fluid with increased pressure supplied from the device for pressurization and supply; and manufacturing, by an evaporator, a gas by reducing pressure of fluid whose pressure and temperature are increased after heat exchange by the heat exchanger;

wherein the increasing pressure of raw fluid and supplying the raw fluid with increased pressure by a device for pressurization and supply comprising:

increasing pressure of the raw fluid as a material of the gas, by the gas itself manufactured by reducing, by use of the evaporator, pressure while securing a mass flow rate by utilization of a density difference between the gas and the raw fluid, and supplying the raw fluid with increased pressure to the heat exchanger.

* * * * *